3,324,764
PHOTOGRAPHIC DOCUMENTARY STORAGE PROCESS AND APPARATUS
Gerald Altman, 41 Westminster Road,
Newton Center, Mass. 02159
Continuation of application Ser. No. 336,537, Jan. 8, 1964. This application Aug. 15, 1966, Ser. No. 572,624
30 Claims. (Cl. 88—24)

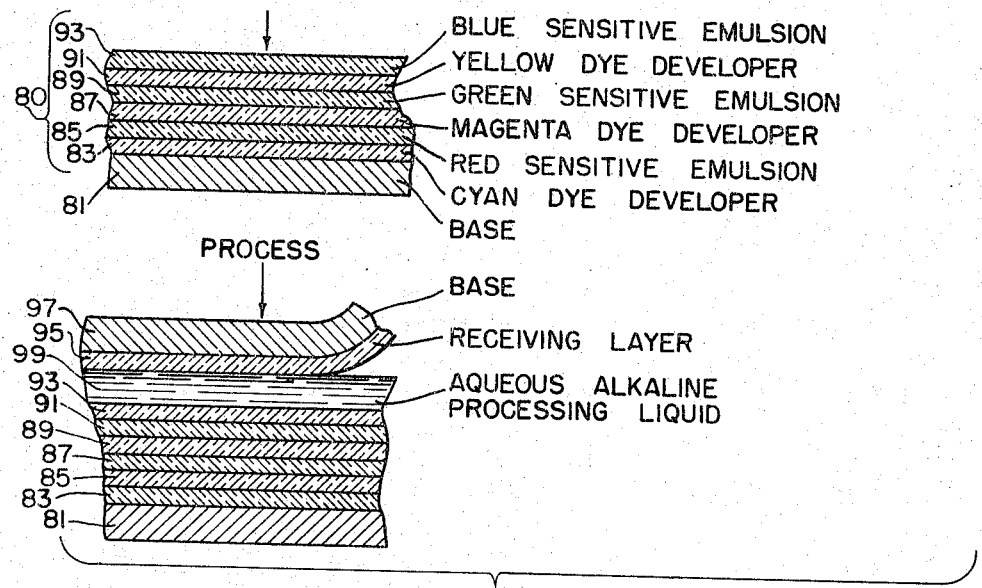
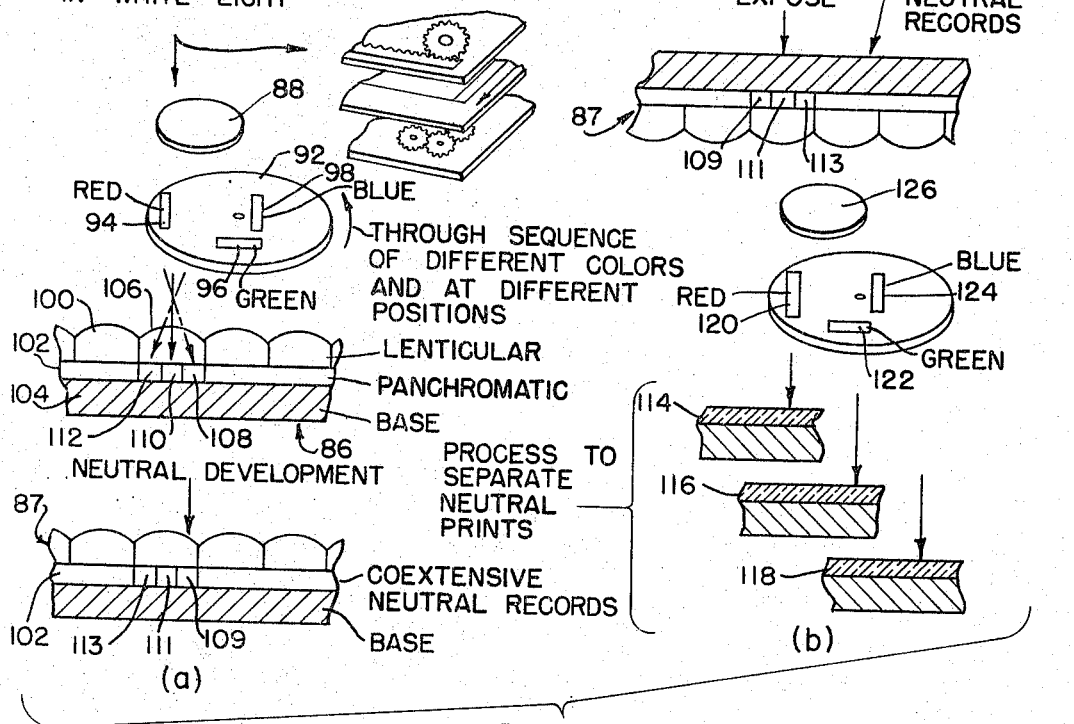

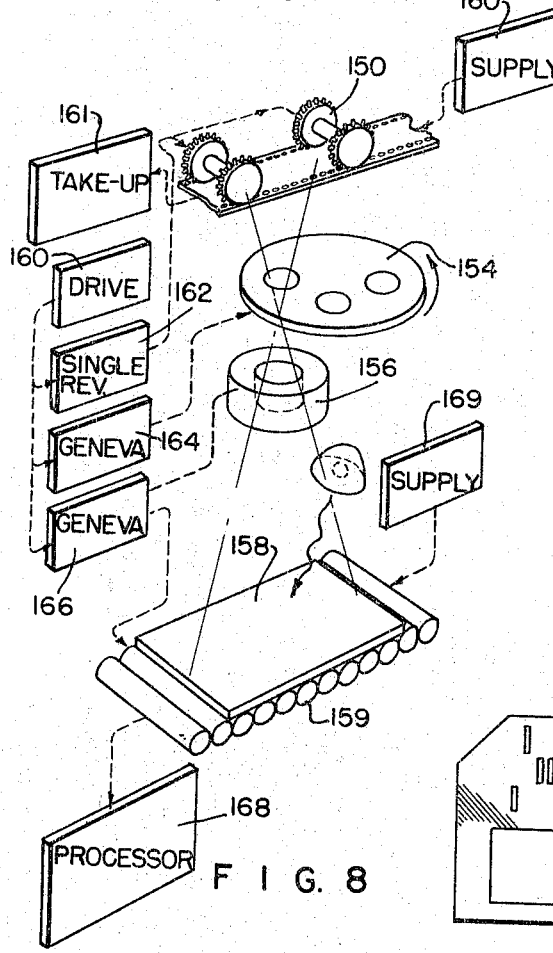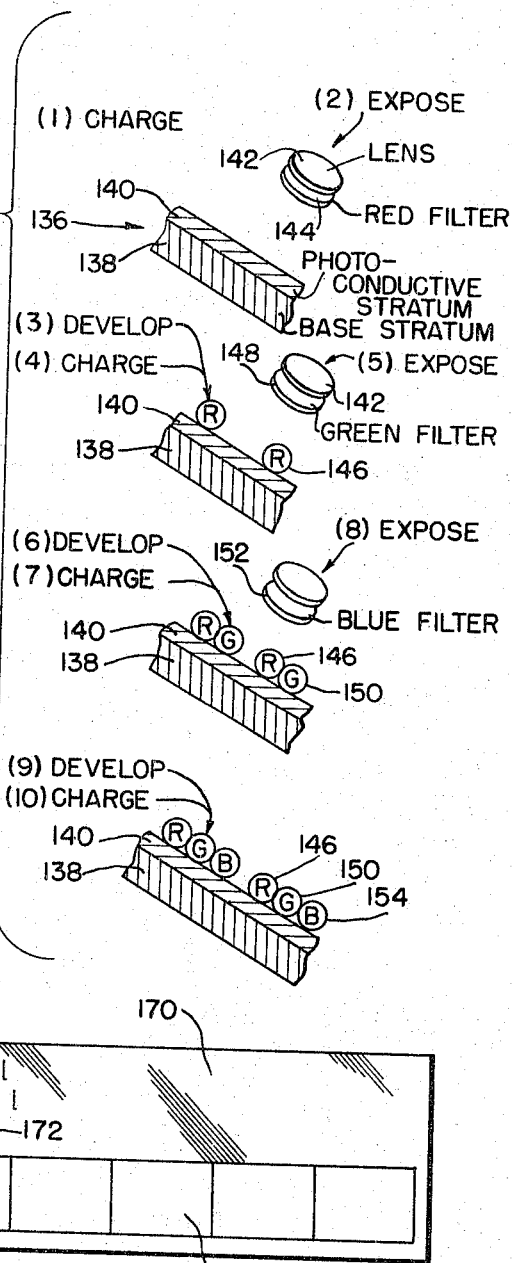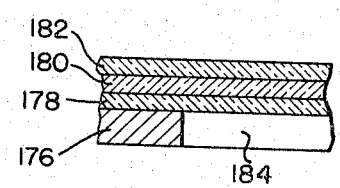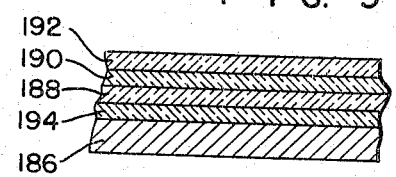

This application is a continuation of my application Ser. No. 336,537, filed Jan. 8, 1964, now abandoned.

The present invention relates to the formation, storage and retrieval of visual records and, more particularly, to increasing the number of visual records, in one sense the density of information, that can be stored in and retrieved from a photographic record medium of given dimensions. One purpose of relatively small record media, particularly photographic miniaturizations such as microfilm in strip form with edge sprocket holes or on coded cards that are randomly accessible from a stack, is the condensation of a relatively large record into a relatively small space. Thus, in the past, a microfilm frame has been designed to store a larger page of text or sheet of drawing.

The primary object of the present inveniton is the dense storage in a photographic medium of a plurality of different documentary records, which spatially are characteristically unregistrable and substantially coextensive, but which are distinguishable by geometrical and/or physical optics. In an illustrative embodiment of the present invention involving physical optics: a single photographic frame is provided with coextensive records of different documentary subjects in terms of different colors; and images of the coextensive records are distinguished by projection through differently colored filters. In an illustrative embodiment of the present invention involving geometrical optics: a single photographic frame is provided with coextensive records of different documentary subjects via lenticular refraction to produce interspersed image increments; and images of the coextensive records are distinguished via lenticular refraction to isolate certain selected image increments. Thus, in accordance with the present invention, a single microfilm or punched card frame is designed to store a plurality of coded records of symbolic subjects, for example, either alphanumeric or diagrammatic.

Specific objects of the present invention are to provide in the foregoing manner: for the storage and retrieval in a single frame of coextensive representations of documents characterized by symbols of uniform optical character against contrasting background of uniform optical character; for representations that are distinguishable by spatial, spectral and/or interference coding means; for selecting the coding means by suitable control means; and for selecting the single frame from other such frames by suitable control means.

Other objects of the present invention will in part be obvious and will in part appear hereinafter.

The invention accordingly comprises the products, devices and processes, together with their parts, components, steps and interrelationships, which are exemplified in the present disclosure, the scope of which will be indicated in the appended claims. The nature and objects of the present invention are more fully described in the following specification and the accompanying drawings, wherein:

FIG. 1 graphically illustrates certain principles of the present invention;

FIG. 2 graphically illustrates additional principles of the present invention;

FIG. 4 illustrates process steps and resulting products, involving diffusion transfer color photography in accordance with the present invention;

FIG. 5 illustrates process steps and resulting products involving lenticular color photography in accordance with the present invention;

FIG. 6 illustrates a product, involving additive color photography in accordance with the present invention;

FIG. 7 illustrates process steps and resulting products involving color electrophotography in accordance with the present invention;

FIG. 8 is a perspective view of an apparatus embodying the present invention; and FIG. 9 illustrates a specific application of the present invention.

Figure 1:
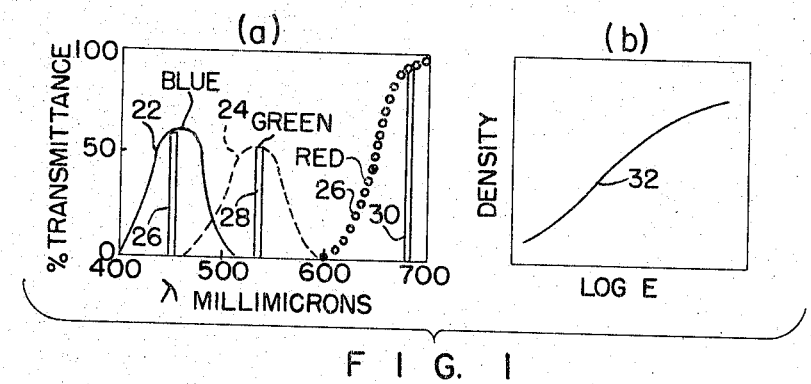
Figure 2:
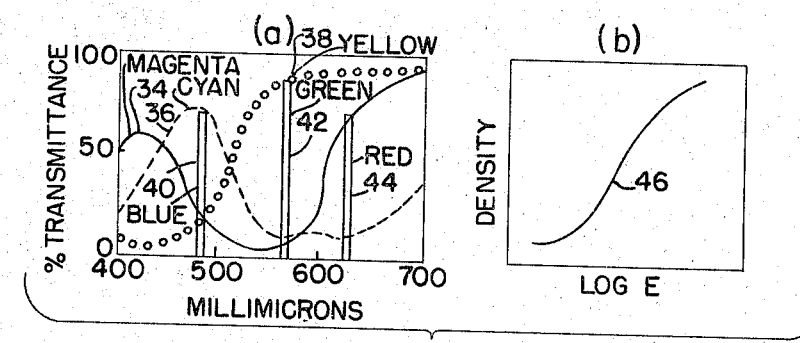

In the applications of the present invention represented by FIGS. 1 and 2, the records of the different subjects are stored and retrieved through narrow bandpass filters which transmit substantially mutually exclusive wavelengths. The bandpass filters in one form are of the Fabry-Perot type in which at least one layer of material transparent to the particular wavelength band contemplated is some multiple of a quarter wavelength of the characteristic frequency of the wavelength band. In a typical transmission type filter, a plurality of alternate strata, each ¼ wavelength thick, which are composed alternately of cryolite and cadmium sulfide, are provided. Alternatively, such a ¼ wave stratum is sandwiched between a pair of half silvered strata to produce similar filtering effect. Such filters, whether characterized by quarter wavelength strata, half wavelength strata or appropriate multiples thereof are called interference filters.

Typical additive color records are shown in FIG. 1(a) wherein blue is shown in full line at 20, green is shown in dashed line at 22 and red is shown in dotted line at 24, these three records being readily achievable with commercially available three color photographic materials. Selected images of selected records are provided with a bandpass filter represented by 26 for blue, a bandpass filter represented by 28 for green and a bandpass filter represented by 30 for red. It will be observed that, as a practical matter, bandpass filters 26, 28 and 30 are separated sharply from each other in wavelength and substantially exclude each other from the wavelength ranges of the records with which they are not asociated. FIG. 1(b) illustrates the H and D curve of a conventional panchromatic silver halide emulsion of normal gamma for the production of a selected corresponding neutral, i.e. black-and-white, record.

Typical wavelength distributions for three coextensive subtractive color records are shown in FIG. 2(a) wherein magenta is shown in full line at 34, cyan is shown in dashed line at 36 and yellow is shown in dotted line at 38, these three records being readily achievable with commercially available three color photographic materials. Selected images of selected records are provided with a bandpass filter represented by 40 for blue, a bandpass filter represented by 42 for green and a bandpass filter represented by 44 for red. It will be observed that, as a practical matter, bandpass filters 40, 42 and 44 are separated sharply from each other in wavelength and substantially distinguish from each other in the actinic effects they permit in the records with which they are associated. FIG. 2(b) illustrates the H and D curve 46 of a panchromatic silver halide emulsion of steep gamma for the production of a selected correspond-neutral, i.e. black-and-white record.

FIG. 3(a) illustrates a preferred process for the production of coextensive records in accordance with the present invention. Generally this process involves exposing a multilayer subtractive color photosensitive film 48 in a suitable camera having an objective 50 to a sequence of different black-and-white, two dimensional, documentary subjects 52 through a sequence of different filters 54, and processing film 48 in order to produce a multicolor print 56. The different subjects primarily contemplated are different pages of printed matter, particularly pages of text, sheets of drawing and other documentary sheet-like formats of like chromatic character. As shown, photosensitive sheet 48 includes a base 58 composed of a cellulosic fibrous material such as paper or a synthetic plastic material such as cellulose nitrate or polyvinyl butyrate. The photosensitive strata, designated 60, 62 and 64 are, respectively, a silver halide emulsion that is blue sensitive and has yellow dye, a silver halide emulsion that is green sensitive and has magenta dye and a silver halide emulsion that is red sensitive and has cyan dye. Processing of photosensitive sheet 48, by appropriate developing formulations well known in the art, results in a frame of superposed records 66, 68 and 70 in terms respectively of yellow, magenta and cyan.

Typical materials and processes for the production of subtractive color prints of the foregoing type are disclosed in U.S. Patent No. 2,176,518, issued Oct. 17, 1939 to I. A. C. Youle for Photochemical Color Process; U.S. Patent No. 2,322,027, issued June 15, 1943 to E. E. Jelley et al. for Color Photography; U.S. Patent No. 2,673,800, issued Mar. 30, 1954 to L. A. Meeussen, et al. for Photographic Material for the Manufacture of Color Images; U.S. Patent No. 2,997,388, issued Aug. 22, 1961 to V. W. Blanchard for Lippmann Emulsion Masking Process; U.S. Patent No. 2,997,390, issued Aug. 22, 1961 to E. H. Land for Novel Color Processes and Products; U.S. Patent No. 3,069,263, issued Dec. 18, 1962 to H. C. Hass for Photographic Products & Processes Using Alkali Permeable Polymeric Layers; and U.S. Patent No. 3,077,400, issued Feb. 12, 1963 to H. G. Rogers et al. for Color Diffusion Transfer Using Gelatine Silver Halide Emulsions Containing Cellulose Ethers. It will be understood that suitable interlayers between the strata of photosensitive product 48 are provided in accordance with well known prior art.

FIG. 3(b) illustrates a process for producing distinct black-and-white representations 72 of yellow, magenta and cyan records 66, 68 and 70, generally designated 56. This process involves the steps of exposing successive frames 74, 76 and 78 of black-and-white panchromatic photosensitive gelatino silver halide emulsion on paper or plastic base, in sequence within a projector having a source illumination 80 and an objective lens 82, through a sequence of filters 84 to multicolor print 56. Sequence of filters 84 of FIG. 3(b) corresponds to sequence of filters 54 of FIG. 3(a). The processing of frames 74, 76 and 78 from latent images to visible black-and-white prints is accomplished by silver halide developing and fixing agents of types well known in the art. It will be appreciated that, in general, the original documents, the storage representations and the final reproductions all are characterized by a multiplicity of discrete shapes of uniform density and a constant background of uniform density, the uniform density of the discrete shapes and the uniform density of the constant background being of contrasting luminosity. Typically the contemplated interference filters have bandwidths of approximately 25 millimicrons or less, i.e. a span of 25 millimicrons between the so-called half-power (½ peak) values (on opposite sides of peak value) and the use of bandwidths of one millimicron or less is feasible.

The following non-limiting example further illustrates the present invention:

EXAMPLE

Figure 3:
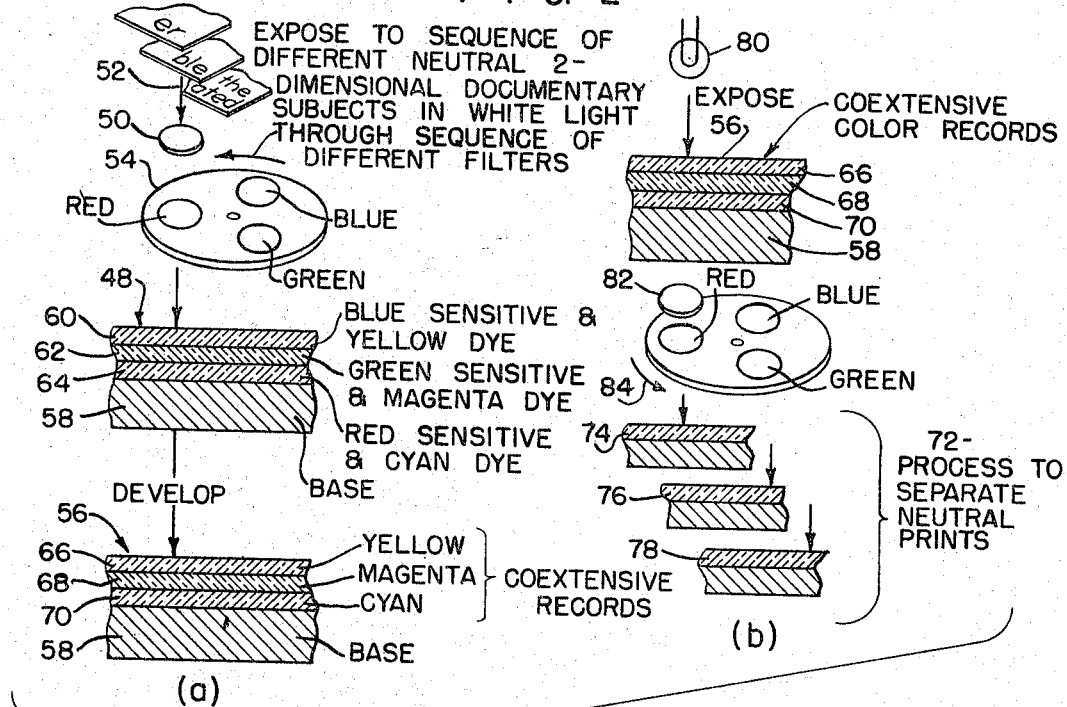
FIG. 3 illustrates process steps and resulting products, involving subtractive color photography in accordance with the present invention.

A color-negative film of the type shown at 48 in FIG. 3 exposed first through a red filter to a first page of black-and-white printed text, second through a green filter to a second page of black-and-white printed text and third through a blue filter to a third page of black-and-white printed text. The color negative film for example, is of the type sold by Eastman Kodak under the trade designation Tri-Mask having a first stratum containing a red sensitive silver halide and cyan coupler (e.g. 5-[p-amylphenoxybenzenesulfonamino] - 1 - naphthol), a second stratum containing a green sensitive silver halide and a magenta coupler (e.g. 1-p-sec. amylphenyl-3-n-amyl-5-pyrazolone) and a third stratum containing a blue sensitive silver halide and a yellow coupler (e.g. N-amyl-p-benzoylacetaminobenzenesulfonate). The exposures are made under daylight conditions at f/2.2 to about 3000 foot candles of white light for about 150 seconds. The red filter is a narrow bandpass filter with transmission in the vicinity of 680 millimicrons, the blue filter is a narrow bandpass filter with transmission in the vicinity of 450 millimicrons and the green filter is a narrow bandpass filter with transmission in the vicinity of 550 millimicrons. The film is developed under conventional conditions with a conventional developer, for example that sold under the trade designation DK–50 (e.g. 2-amino-5-diethylamino toluene hydrochloride-2 grams, sodium sulfite-2 grams, sodium carbonate-20 grams, potassium bromide-2 grams and water to make 100 cubic centimeters). The foregoing materials and steps are of the types described in great detail in the publication of Eastman Kodak Company, Rochester 4, N.Y., entitled "Color Correction With Kodak Tri-Mask Film," Kodak Publication No. Q–6A, published 1962. The resulting multi-color print is used to expose three distinct frames of panchromatic silver halide emulsion through red, green and blue filters, which are counterparts of the filters utilized above. Each of these panchromatic silver halide emulsions, after suitable photoexposure, is developed under conventional conditions with a conventional developer (e.g. development for 3 minutes in a solution of water—3000 cubic centimeters, metol—3 grams, sodium sulfite—44 grams, hydroquinone—12 grams, sodium carbonate—36 grams and potassium bromide 2 grams. Fixing and washing of the multi-color record storage print and of separate final black-and-white prints all are effected in accordance with conventional practice. The final three black-and-white prints constitute a retrieval of three frames representing the original black-and-white pages of text, having been in storage in a single frame of multi-color print for as long as desired.

It will be understood that in embodiments of the invention involving photographic tecchniques other than with silver halide, color strata 60, 62 and 64 of FIG. 1(a) and neutral strata 74, 76 and 78 of FIG. 1(b) are replaced by alternative photosensitive materials, for example: a ferric composition capable of being developed by potassium ferrocyanide; a diazo material capable of being developed by an alkali; a bichromated material capable of being differentially hardened and dyed; a photopolymerizable material capable of being differentially polymerized in response to incident light, as U.S. Patent No. 2,948,611, issued on Aug. 9, 1960 in the name of A. L. Barney for Photopolymerizable Elements and Processes; a photothermographic material capable after photoexposure of being developed by heat, as in U.S. Patent No. 2,905,839, issued on Oct. 12, 1937 in the name of S. E. Sheppard et al. for Photothermographic Composition; or a phototropic material capable of being differentially darkened by light without development, as in U.S. Patent No. 2,953,454, issued on Sept. 20, 1960 in the name of E. Berman for Phototropic Data Storage Capsules and Base Coated Therewith.

Another substractive color process embodying the present invention is illustrated in FIG. 4 as involving a multicolor photosensitive sheet 80 specifically as is shown in U.S. Patent No. 3,077,400, issued Feb. 12, 1963 to H. G. Rogers et al. for Color Diffusion Transfer Using Gelatino Silver Halide Emulsions Containing Cellulose Ethers. The photosensitive product is shown generally at 80 as including, in sequence, a support 81, a cyan dye developer layer 83, a red-sensitive silver-halide emulsion layer 85, a magenta dye developer layer 87, a green-sensitive water-soluble cellulose derivative containing silver halide emulsion layer 89, a yellow dye developer layer 91 and a blue-sensitive water-soluble cellulose derivative containing silver halide emulsion layer 93. After photoexposure to three successive neutral documents through red, green and blue filters in steps analagous to steps described in connected with FIG. 1(a), product 80 is processed by spreading a viscous processing liquid composition 99 between outermost layer 93 and an image receiving layer 95, which is supported on a backing 97, composed of paper or plastic. A color print is formed in image receiving layer 95 by diffusion transfer, the dye developer molecules at exposed areas of the photosensitive emulsions becoming immobilized after effectuating development and the dye developer molecules at unexposed areas of the emulsions becoming captured by the image receiving layer after diffusion into and through the processing liquid composition. Dye developers of the foregoing type contain, in the same molecule, a silver halide developer function and a chromophoric dye function. Silver halide developer function means a functional group that is capable of developing exposed silver halide. Preferred silver halide developer groups include hydroquinonyl, ortho-dihydroxyphenyl, ortho-amino substituted hydroxyphenyl and para-amino substituted hydroxyphenyl systems. A chromophoric dye function means a functional group that is capable of assuming predetermined optical characteristics, for example, when subjected to alkaline environment. Preferred chromophoric dye groups include azo-indophenol, indo-aniline, azomethine and anthraquinone systems. A typical processing liquid formulation includes in water by total weight: sodium hydroxide—3%; 1-phenyl-3-pyrazolidone—1.2%; 2,5-bis-ethylene minohydroquinone—0.9%; 6-nitrobenzimidazole—0.12%; and sodium carboxymethyl cellulose—5.0%. It will be apparent that additive or subtractive colors may be produced in accordance with this process. The multiple records produced as above are used as in FIG. 1(b) to produce separate neutral prints.

FIG. 5(a) generally discloses the steps of exposing a so-called lenticular color film 86 within a camera having an objective lens 88 to three different documentary formats of like color distribution a sequence 92 of differently positioned filters. In conventional fashion, sequence of filters 92 includes red, green and blue bands 94, 96 and 98. Lenticular film 86 includes a lenticular stratum 100, a photosensitive stratum 102 and a support 104. Lenticular stratum 100, for example composed of hardened gelatine, includes a multiplicity of cylindrical embossed ridges or lenses 106. Photosensitive stratum 102 is a gelatino silver halide panchromatic emulsion stratum, which may be considered to have under each lens 106 a series of three incremental bands 108, 110 and 112, corresponding optically to filters 94, 96 and 98. Development of lenticular film 86 to provide a lenticular print 87 is accomplished by a conventional black-and-white developer of the type mentioned in connection with FIG. 1. When developed, stratum 102 contains increments 109, 111 and 113 in terms of neutral densities corresponding to the light received through red, green and blue filters 94, 96 and 98. The steps of FIG. 5(b) generally include photo-exposing separate silver halide panchromatic emulsion frames 114, 116 and 118 through lenticular print 87 and through a sequence of filters 120, 122 and 124 in a projector having an objective lens 126 and a source of illumination 128. These frames then are processed to provide neutral reproductions of the neutral original documentary formats. Additional details of lenticular film products and processes of use in accordance with the present invention are disclosed in: U.S. Patent No. 2,726,154, issued Dec. 6, 1955 to E. H. Land for Photographic Products; U.S. Patent No. 2,950,644, issued Aug. 30, 1960 to E. H. Land et al. for Cinematographic Method and Apparatus; and U.S. Patent No. 2,992,103, issued July 11, 1961 to H. L. Land et al. for Photographic Transfer Reversal Processes Utilizing Screen Members. In one form of the foregoing product and process, more than three record increments are associated with each lens 100 merely by using more than three differently positioned, band-pass filters, for example interference filters of the type described in connection with FIG. 3.

FIG. 6 discloses a color screen product in the form of a mosaic of colored increments 130, a gelatino silver halide panchromatic emulsion stratum 132 and a support 134. As shown, mosaic 130 includes red, green and blue incremental filters in contiguity with corresponding increments of photosensitive stratum 132. After exposure and development in accordance with the steps set forth in connection with FIG. 1(a) the product is provided in stratum 132 with three records in terms of interspersed neutral increments which are inherently in registration with the interspersed filters 130. The resulting print is used in accordance with the present invention are disclosed in U.S. Patent No. 2,614,926, issued Oct. 21, 1952 to E. H. Land for Photographic Product Comprising an Additive Color Screen, A Silver Halide Layer and a Ruptureable Container and a Process of Additive Color Photography; U.S. Patent No. 1,358,802, issued Nov. 16, 1920 to F. N. Warner for Art of Color Photography; U.S. Patent No. 2,992,103, issued July 11, 1961 to E. H. Land et al. for Photographic Transfer-Reversal Processes Utilizing Screen Members; and U.S. Patent No. 2,983,606, issued May 9, 1961, to H. G. Rogers for Processes and Products for Forming Photographic Images in Color.

FIG. 7 generally discloses the steps of exposing and developing an electrographic sheet 136, which includes a base stratum 138 and a photoconductive stratum 140, in a photographic apparatus having an objective lens 142. Typically these steps involve charging photoconductive stratum 140 uniformly, exposing to a first document through a red filter 144 to produce an electrostatic charge pattern corresponding to red, subjecting photoconductive stratum 140 to dispersed red particles 146, recharging photoconductive stratum 140 uniformly, exposing to a second document through a green filter 148 to produce an electrostatic charge pattern corresponding to green, subjecting photoconductive stratum 140 to dispersed green particles 150, recharging photoconductive stratum uniformly, exposing to a third document through a blue filter 152 and subjecting photoconductive stratum 140 to dispersed blue particles 154. Fixing of red, green and blue particles 146, 150 and 154 is effected in steps that are known in the prior art. The resulting print is used in accordance with the steps of FIG. 1(b) to produce black-and-white prints of the type shown at 74, 76 and 78 in FIG. 1(b). In one form of the process and product of FIG. 7, more than three exposures of more than three documents are made and the compositions of the development particles are chosen so that each constitutes a narrow bandpass filter. It will be appreciated that the foregoing electrophotographic products and processes may involve either additive or substractive colors.

Photoconductive stratum 140 for example contains as a photoconductor: a photoconductive oxide, sulfide, selenide, telluride or iodide of cadmium, mercury, antimony, bismuth, thallium, molybdenum, aluminum, lead or zinc; or arsenic trisulfide, cadmium arsenide or lead chromate. Photoconductive stratum 140, for example, contains as a vehicle an electrically insulating film forming polymer having high dielectric constant and high dielectric strength, such as polyvinyl alcohol, hydroxyethyl cellulose, carboxymethyl cellulose, gum arabic or guar gum. The thickness of photoconductive stratum 140 is not critical but preferably ranges between 0.0003 to 0.002 inch. The relative proportions of photoconductor to vehicle range between 1:1 and 9:1. Specifically useful electrophotographic products and steps are disclosed in U.S. Patent No. 2,940,847, issued June 14, 1960, to E. K. Kaprelian for Electrophotography; U. S. Patent No. 2,962,374, issued Nov. 29, 1960, to J. H. Dessauer for Color Xerography; and U.S.

Patent No. 3,057,720 issued Oct. 9, 1962, to R. E. Hayford et al. for Xerographic Color Reproduction.

FIG. 8 discloses an apparatus within which a plurality of geometrically coextensive, physical distinguishable records of any of the types described above are utilized in the form of microfilm to produce a plurality of geometrically distinct relatively large records. This apparatus comprises the pair of sprockets 150 for advancing a frame of microfilm at 152 into projection position, each frame of microfilm 152 being provided with sprocket holes 152 at its edges and containing three coextensive, color distinguishable records. When in projection position, the frame of microfilm 158 is sequentially projected through a sequence of color filters 154 and an objective lens 156 and shutter (not shown) in order to photoexpose a sequence of gelatine silver halide panchromatic emulsion films 158. The mechanism is driven by a suitable motor 160, which operates through a single revolution clutch 162 to advance microfilm 152 one frame each cycle, through a Geneva mechanism 164 to advance filters 154 three times each cycle and through a Geneva mechanism 166 to advance photosensitive films 158 via rolls 159 into and out of exposure position three times each cycle. As shown, microfilm 152 is supplied from a supply spool 160 and advances to takeup spool 161. Similarly photosensitive sheets 158 advance from a supply stack 169 through a processor 168 by which they are converted into black-and-white prints. In a modification of the apparatus of FIG. 8, photosensitive sheets 158 are replaced by a sequence of documentary formats, such as the sequential pages of a book, and the mechanism is operated in reverse to provide a multicolor photosensitive strip carried by sprockets 150 with a plurality of geometrically coextensive, chromatically distinguishable records. It will be understood that this multicolor photosensitive strip is of any of the multicolor photosensitive materials described above. Details of an automatic filter changing mechanism adapted for incorporation in the above described mechanism are shown in U.S. Patent No. 3,107,578, issued Oct. 22, 1963 in the name of G. Engelage for Filter-Operating Arrangement for a Photographic Printing Apparatus. Details of photographic printing systems adapted for incorporation in the above described mechanism are shown in U.S. Patent No. 2,891,443, issued June 23, 1959, in the name of J. S. Pollock for Photographic Color Printer; and U.S. Patent No. 2,933,030, issued Apr. 19, 1960, in the name of W. Bornemann for Photographic Printing Apparatus.

FIG. 9 discloses a punched card 170 having a series of rows 172 of punched holes and a row of multicolor photosensitive frames 174, which are of any of the types described above and each of which is provided when processed with records that are coextensive geometrically and distinguishable physically. In one form frames 174 are multicolor transparencies 178, 180, 182 mounted in apertures 184 for disascopic projection. In another form frames 174 are multicolored transparencies 188, 190, 192 backed by a reflectively metallized material 194 on an opaque base 186 for enhanced episcopic projection. It will be apparent that the five frames illustrated in FIG. 9, with the commercially available materials described above, are capable of storing fifteen records. Microfilm and punched card devices and structures of types useful in connection with the present invention are described in detail in: U.S. Patent No. 2,963,940, issued on Dec. 13, 1960, in the name of H. A. Reabe for Microfilm Viewing and Storage Apparatus: U.S. Patent No. 3,105,410, issued Oct. 1, 1963, in the name of R. A. Clapp for Photographic Printer; and U.S. Patent No. 3,090,146, issued May 21, 1963, in the name of R. Beispel for Record Card.

The present invention thus provides a simple but versatile technique for storing visual representations of large documents in the form of photographic miniaturizations and retrieving the visual representation in the form of large photographic reproductions. Although the present invention is concerned primarily with the storage and reproduction of single-tone records, e.g. neutral, the illustrated color coding technique, in one form is applied to a plurality of multicolor records that are superposed in terms of a plurality of sets of tri-stimulus radiation passbands, all of which passbands are mutually exclusive. In one case, two multicolor records are superposed, the first in terms of given hues of red, green and blue and the second in terms of other hues of red, green and blue, all of the hues having non-overlapping curves of radiation wavelength vs. transmittance. Since certain changes may be made in the foregoing disclosure without departing from the scope of the invention herein, it is intended that all matter contained in the foregoing description or shown in the accompanying drawings be interpreted in an illustrative and not in a limiting sense.

What is claimed is:

1. Documentary storage photographic means comprising:
   (a) optical objective means defining an object field for a plurality of views and a record field for a plurality of representations;
   (b) optical separation means for optical association with said optical objective means providing changeable optical code means characterized by a plurality of optically operable differences;
   (c) photographic means substantially operatively stationary in said record field for the storage in a single photographic frame of a plurality of coextensive representations of a plurality of documentary subjects;
   (d) said documentary subjects being characterized by documentary symbols against contrasting background, the symbols of one of said documentary subjects being unregistrable with the symbols of others of said documentary subjects, said symbols being of substantially uniform optical character and said background being of substantially uniform optical character; and
   (e) control means effective for selection of certain of said changeable optical code means in order to communicate selected coextensive representations in said frame with said object field and to obscure others of said coextensive representations in said frame from said object field.

2. The documentary storage photographic means of claim 1 wherein said objective means is a camera lens and said photographic frame is photosensitive.

3. The documentary storage photographic means of claim 1 wherein said objective means is a projection lens and said photographic frame is developed.

4. The documentary storage photographic means of claim 1 wherein said optical code means includes optical filter means.

5. The documentary storage photographic means of claim 1 wherein said optical code means includes optical interference means.

6. The documentary storage photographic means of claim 1 wherein said optical code means includes variable optical aperture means.

7. The documentary storage photographic means of claim 1 wherein said optical code means includes spectral filter means.

8. The documentary storage photographic means of claim 1 wherein said optical code means includes interference filter means.

9. The documentary storage photographic means of claim 1 wherein said optical code means is characterized by plural spectral filter means and said frame is characterized by plural spectral image means.

10. The documentary storage photographic means of claim 1 wherein said optical code means is characterized by plural aperture locations and a distribution of minute refracting means is positioned in contiguity with said frame.

11. Documentary storage photographic means comprising:
(a) optical objective means defining an object field for plural views and a record field for plural representations;
(b) optical separation means for optical association with said optical objective means providing plural optical code means characterized by plural optically operable differences;
(c) photographic storage means having plural photographic frames;
(d) first control means effective at any given time for the association of certain of said frames with said optical objective means and said optical separation means;
(e) each of said frames being constituted for storing plural coextensive representations of plural documentary subjects;
(f) said documentary subjects being characterized by documentary symbols against contrasting background, the symbols of one of said documentary subjects being unregistrable with the symbols of others of said documentary subjects; and
(g) second control means effective at any given time for selection of certain of said plural optical code means in order to communicate one of said coextensive representations with said object field and to obscure others of said coextensive representations from said object field.

12. The documentary storage photographic means of claim 11 wherein said objective means is a camera lens and said photographic frame is photosensitive.

13. The documentary storage photographic means of claim 11 wherein said objective means is a projection lens and said photographic frame is developed.

14. The documentary storage photographic means of claim 11 wherein said optical code means includes optical interference means.

15. The documentary storage photographic means of claim 11 wherein said optical code means includes variable optical aperture means.

16. The documentary storage photographic means of claim 11 wherein said optical code means includes filter means.

17. Documentary, high density storage, still photographic apparatus comprising optical objective means for conjugately defining a changeable field for successive views and a focal region for successive representations, optical selecting means having successively operable optical coding means characterized by successive operable differences, said optical coding means being constrained for selective movement in successive association with said optical objective means between said changeable field and said focal region, positioning means for a photographic record that coextensively stores said successive representations, said photographic record having successive contiguous sets of coded increments with successive locational differences, each of said sets being distributed coextensively throughout said record, said positioning means maintaining said record stationary with respect to said successive association during said selective movement of said optical coding means in said successive association, said optical coding means at any time communicating one of said successive sets with one of said successive views and obscuring others of said successive set from said one of said successive views, certain ones of said sets representing different substantially unregistrable documentary symbols that are presented as shapes of constant spectral and luminous character against a background of constant spectral and luminous character, said constant spectral and luminous character of said shapes and said constant spectral and luminous character of said background constituting a discontinuity in tone.

18. The documentary storage photographic apparatus of claim 17 wherein said optical coding means includes successive filters having successive spectral transmission characteristics, and said successive sets have successive spectral photographic characteristics.

19. The documentary storage photographic apparatus of claim 17 wherein different geometrical locations are established by said optical coding means with respect to said optical objective means when in said successive association, and said successive sets are established in conjunction with a multiplicity of minute refracting means in contiguity with said record, increments of said sets being interspersed.

20. The documentary storage photographic apparatus of claim 17 wherein said optical objective means includes a camera lens and said photographic record is photosensitive.

21. The documentary storage photographic apparatus of claim 17 wherein said optical objective means includes a projection lens and said photographic record is a developed print.

22. The documentary storage photographic apparatus of claim 17 wherein automated means are provided for controlling said selective movement.

23. Documentary, high density storage, still photographic apparatus comprising objective lens means defining a changeable field for a succession of views and a focal region for a succession of representations, optical coding means having a succession of spectral filters with a succession of spectral differences thereamong, constraining means in operative association with said optical coding means for selective movement of said spectral filters into operative association with said objective lens means between said changeable field and said focal region, an integral photographic storage at said focal region including a succession of sets of coded increments with a succession of spectral differences thereamong, each of said sets being distributed coextensively throughout said storage, and means for controlling said selective movement of said spectral filters while maintaining said photographic storage stationary with respect to said objective lens means, said optical coding means at any time communicating one of said succession of sets with one of said succession of views and obscuring others of said succession of sets from said one of said succession of views, certain ones of said sets representing substantially unregistrable, documentary subjects having different documentary symbols that are presented as shapes of constant spectral and luminous character against a background of constant spectral and luminous character, said constant spectral and luminous character of said shapes and said constant spectral and luminous character of said background constituting a discontinuity in tone.

24. Documentary, high density storage, still photographic apparatus comprising objective lens means defining along an axis a changeable field for successive views and a focal region for successive representations, optical coding means defining aperture means constrained for movement into successive spacings in reference to axis, said successive spacings being in operative association with said objective lens means between said changeable field and said focal region, an integral photographic storage at said focal region including record statum means and refracting stratum means, said record stratum means having a distribution of photographic composition, said refracting stratum means having a distribution of minute lens means, said aperture means in said successive spacings defining, in cooperation with said minute lens means and said objective lens means, successive sets of coded increments with successive spatial differences in said record stratum means, each of said sets being distributed coextensively throughout said record stratum means, and means for controlling said movement of said aperture means while maintaining said photographic storage stationary with respect to said objective lens means, said optical coding means at any time communicating one of said successive sets with one of said successive views and obscuring others of said successive sets from said one of said successive views, certain ones of said sets representing different substantially unregistrable, documentary subjects having different documentary symbols that are presented as shapes of constant spectral and luminous character against a background of constant and luminous character of said shapes and said constant spectral and luminous character of said background constituting a discontinuity in tone.

25. A documentary, high density storage, still photographic process for producing coextensive photographic records of a succession of different views, said process comprising the steps of positioning an integral photosensitive storage sheet at the focal region of an optical objective means defining a field in conjugate relation with said focal region, sequentially photoexposing said photosensitive storage via said optical objective means to said succession of different views, through a succession of coded filters having a succession of spectral differences thereamong, said photosensitive storage including a succession of sets of coded increments with a succession of spectral differences thereamong, each of said sets being distributed coextensively throughout said photosensitive storage, maintaining said photosensitive storage stationary relative to said optical objective means while so sequentially photoexposing said photosensitive storage to provide said coextensive photographic records, certain ones of said sets representing different substantially, unregistrable, documentary subjects having different documentary symbols that are presented as shapes of constant spectral and luminous character against a background of constant spectral and luminous character, said constant spectral and luminous character of said shapes and said constant spectral and luminous character of said background constituting a discontinuity in tone.

26. A documentary, high density storage, still photographic process for producing coextensive photographic records of a succession of different views, said process comprising the steps of positioning an integral photosensitive storage sheet at the focal region of an optical objective means defining a field in conjugate relation with said focal region along an optical axis, sequentially photoexposing said photosensitive storage via said optical objective means to a succession of different views in said field through a succession of coded aperture locations having a succession of spatial differences thereamong with respect to said axis when in operative association with said optical objective means, said photosensitive storage including record stratum means having a distribution of photographic composition, said refracting stratum means having a distribution of minute lens means, said succession of coded apertures defining, in cooperation with said minute lens means and said objective lens means, a succession of sets of coded increments with a succession of spatial differences in said record stratum means, each of said sets being distributed coextensively throughout said photosensitive storage, and maintaining said photosensitive storage stationary relative to said objective means while so sequentially photoexposing said photosensitive storage to provide said coextensive photographic records, certain ones of said sets representing different substantially unregistrable, documentary subjects having different documentary symbols that are presented as shapes of constant spectral and luminous character against a background of constant spectral and luminous character, said constant spectral and luminous character of said shapes and said constant spectral and luminous character of said background constituting a discontinuity in tone.

27. A documentary, high density storage photographic process for sequentially presenting a succession of different views from coextensive photographic records of an integral storage sheet, said process comprising the steps of positioning said integral photographic storage sheet at the focal region of an optical objective means defining a field in conjugate relations with said focal region, said photographic storage sheet including said coextensive photographic records as a succession of sets of coded increments with a succession of spectral differences thereamong, each one of said sets being distributed throughout said photographic storage sheet, sequentially presenting a succession of views corresponding to said photographic records via said optical objective means through a succession of coded filters having a succession of spectral differences thereamong, and maintaining said photographic storage stationary relative to said optical objective means while so sequentially presenting said succession of different views, certain ones of said sets representing different substantially unregistrable, documentary subjects having different documentary symbols that are presented as shapes of constant spectral and luminous character against a background of constant spectral and luminous character, said constant spectral and luminous character of said shapes and said constant spectral and luminous character of said background constituting a discontinuity in tone.

28. A documentary, high density storage, still photographic process for presenting a succession of different views from the coextensive photographic records of an integral storage frame, said process comprising the steps of positioning said integral photographic storage frame at the focal region of an optical objective means defining a field in conjugate relation with said focal region along an axis, said photographic storage frame including record stratum means and refracting stratum means, said record stratum means having a distribution of visual composition, said refracting stratum means having a distribution of minute lens means, said record stratum means including said coextensive photographic records as a succession of interspersed sets of coded increments with a succession of spatial differences thereamong, each one of said sets being dispersed throughout said photographic storage frame, sequentially presenting a succession of views corresponding to said photographic records via said optical objective means through a succession of coded aperture locations having a succession of different spacings with respect to said axis, and maintaining said photographic storage frame stationary relative to said optical objective means while so sequentially presenting said succession of different views, certain ones of said sets representing different substantially unregistrable, documentary subjects having different documentary symbols that are presented as shapes of constant spectral and luminous character against a background of constant spectral and luminous character, said constant spectral and luminous character of said shapes and said constant spectral and luminous character of said background constituting a discontinuity in tone.

29. A storage and retrieval process for a plurality of different representations of a plurality of different visual documents characterized by documentary symbols against contrasting background, said symbols being of substantially uniform optical character and said background being of substantially uniform optical character, the symbols of one of said documents characteristically being unregistrable with the symbols of others of said documents, said process comprising the steps of exposing a single photosensitive frame while stationary to said plurality of documents in terms of a plurality of different radiation fields having a plurality of optical differences thereamong and producing thereby said plurality of different representations in said single frame, said different representations being substantially coextensive with each other substantially throughout said frame, and communicating selected ones of said plurality of different radiation fields with said frame while stationary in order thereby to present selected images of said different visual documents.

30. The storage and retrieval process of claim 28 wherein said photosensitive storage contains a photosensitive composition selected from the class consisting of silver halide material, ferric material, diazo material, bichromated material, photopolymerizable material, photothermographic material, phototropic material and electroscopic material.

References Cited

UNITED STATES PATENTS

| | | | |
|---|---|---|---|
| 3,076,961 | 2/1963 | Ribbero | 343—6 |
| 3,260,563 | 7/1966 | Howard | 352—45 |
| 3,267,826 | 8/1966 | Browning | 95—18 |
| 3,291,555 | 12/1966 | Browning | 352—244 |

OTHER REFERENCES

Y. N. Denisyuk, "On the Reproduction of the Optical Properties of an Object by the Above Field of Its Scattered Radiation," Optics and Spectroscopy (Optical Society of America), vol. 15, 1963, page 279.

P. J. Van Heerden, "Theory of Optical Information Storage in Solids," Applied Optics (Optical Society of America), vol. 2, 1963, page 393.

NORTON ANSHER, *Primary Examiner*.

R. A. WINTERCORN, *Assistant Examiner*.